United States Patent Office 3,152,018
Patented Oct. 6, 1964

3,152,018
ROOM TEMPERATURE PHOSPHATE
COATING COMPOSITION
Frank G. Pollard, Southgate, Mich., assignor to Wyandotte Chemicals Corporation, Wyandotte, Mich., a corporation of Michigan
No Drawing. Filed Nov. 1, 1961, Ser. No. 149,208
5 Claims. (Cl. 148—6.15)

This invention relates to a method and compositon for producing phosphate coatings on metal. More specifically, this invention concerns a composition capable of producing iron phosphate coatings on steel surfaces in room temperature spray or dip operations.

The phosphate coating compositions of this invention are of the type commonly referred to as noncoating phosphate compositions as distinguished from the so-called coating phosphate compositions. Basically, the difference between the noncoating and coating phosphate compositions is that the metal component of the noncoating phosphate coating chemical does not become a part of the coating formed on the surface of the metal whereas it does in the coating phosphates.

Originally, the formation of phosphate coatings on metal surfaces required prolonged contact between the metal and the phosphate solution, the contact time being measured in hours. Because of this, the so-called tank method of phosphating was widely used. In the tank method, the parts that were to be phosphated were simply soaked in an unagitated tank of aqueous phosphating composition. Subsequently, as the art developed, various techniques and accelerators were discovered which enabled excellent phosphate coatings to be formed on metal surfaces in as little as one or two minutes. These discoveries, which reduced the reaction time necessary between the metal surfaces and phosphate coating solution, permitted the utilization of spray techniques. The spray method of applying the phosphate coating composition to the surface of steel is now very popular in that the steel surfaces can be phosphated in much shorter processing cycles.

While many improved compositions and techniques are suggested in the art for producing better quality phosphate coatings at reduced costs, there still remains a major shortcoming. This shortcoming resides in the fact that the phosphate coating compositions must be heated substantially above room temperature in order to achieve a favorable reaction rate as between the coating composition and the metal object to be coated. Heretofore, it was recognized that the production of good phosphate coatings on metals was, among other considerations, highly dependent on the time and temperature at which the coating solution and metal were in contact. It also was recognized that a shorter contact time could be achieved through the utilization of higher coating application temperatures and likewise that good coatings could be produced at low temperatures provided that the contact time between the metal surface and coating composition was of sufficient duration. Thus, those in the art are confronted with economic considerations in choosing the most profitable method of producing phosphate coatings.

Basically, the purpose for producing a phosphate coating on a steel surface is to inhibit the corrosion of the steel and to provide a surface which will give a good bond with paints and lacquers. Therefore, it is at once apparent that the phosphate coating which is formed on the surface of the metal must be of the highest quality since all subsequent steps in the preparation and protection of the metal surface will be performed on the phosphate coating. In order to obtain the necessary coating quality it has been found through experience that the phosphate coating compositions presently known in the art must be used at a temperature of at least 110 to 115° F. in order to produce any semblance of a phosphate coating and preferably at a temperature of about 150° F. The cost of heating the phosphate coating composition to such temperatures presents a serious economic obstacle when the object to be coated is of little monetary value, such as children's toys. In addition to the cost factor, all the difficulties of working with hot fluids are presented.

It is an object of this invention to provide a phosphate coating composition which is capable of producing at room temperature a phosphate coating on the surface of ferrous metals which is equal in or superior in properties to those coatings now employed.

A further object is to provide a coating composition and a method of application which will enable the cleaning and phosphatizing of ferrous metals in a single operation and at room temperature.

Other objects and advantages of this invention will become apparent from the following detailed description.

I have discovered certain phosphate coating compositions which produce a good phosphate coating on the surface of ferrous metals at any temperature in the range of about 60° F. to 190° F., the most preferable coatings being obtained when these compositions are applied at a temperature of about 70° F. to 100° F.

The phosphate coating compositions of this invention are based on the discovery that noncoating phosphate compositions can produce phosphate coatings at room temperature if the following conditions are satisfied:

(1) At least 2 weight percent of the phosphate constituents of the composition being a complex phosphate,
(2) The composition contains one or more accelerators from a group hereinafter defined, and
(3) The composition is used within a pH range of 3.0 to 5.0.

When dealing with "noncoating phosphate" solutions, the mechanism involved in the coating process seems to be one in which the iron from the ferrous surface dissolves, comes into contact with phosphate ions and then precipitates as ferrous phosphate upon the surface it originally comprises. In the compositions of this invention the complex phosphates serve both to dissolve and bring the iron from the ferrous surface of the article to be coated into solution and to furnish phosphate ions. I have found that while the entire phosphate content of the coating composition can be complex phosphates, at least 2 weight percent of the phosphate component must be complex phosphates. Due to the relatively high cost of complex phosphates and since it is desirable to have a high density of phosphate ions close to the surface of the article to be coated so as to provide ample opportunity for the iron ions to come into immediate contact with the phosphate ions and thus precipitate back onto the article's surface, ortho-phosphates may be used in conjunction with the complex phosphates as a source of phosphate ions. For example, good results have been achieved with compositions comprising 65 to 95 weight percent of ortho-phosphates and 5 to 20 weight percent of complex phosphates.

Although the terms "complex phosphates" and "ortho-phosphates" are widely used and understood in the art, the term "complex phosphate" should, for the purposes of this invention, be understood to include the following: alkali metal tripolyphosphate, alkali metal acid pyrophosphate, tetrasodium pyrophosphate, tetrapotassium pyrophosphate, sodium hexametaphosphate and sodium tetraphosphate. The term "alkali metal" is used to include the sodium, potassium, and ammonium compounds together with lithium and the other well known alkali metals. The term "ortho-phosphate" is used herein to designate phosphoric acid, monosodium phosphate, anhydrous disodium phosphate, disodium phosphate dihydrate, anhydrous trisodium phosphate, trisodium phosphate dodecahydrate, monopotassium phosphate, tripotassium phosphate, monoammonium phosphate, and diammonium phosphate.

The preferred accelerator in this invention is hydroxylamine and its salts, such as hydroxylamine sulfate, nitrate, hydrochloride and fluorosilicate. However, other accelerators or mixtures thereof such as potassium bromate and hydroquinone can also be used. When hydroxylamine or its salts is used as the accelerator it should be present in an amount of from 1 to 10 weight percent of the over-all phosphate coating composition.

Thus, the phosphate coating composition of this invention comprises about 2 to 99 weight percent of complex phosphates, about 0 to 97 weight percent of ortho-phosphates and about 1.0 to 10 weight percent of hydroxylamine or its salts, the above weight percents being based on the total weight of the composition. In application, the coating composition may be sprayed onto the metal surface to be coated, or the metal may be immersed in the coating composition. With either type of application, excellent, uniform coatings are formed on the surface of the metal in about one minute at a temperature in the range of about 70 to 100° F.

I have found that the best coatings are obtained when the above described composition is used in concentrations of ½ to 4 ounces per gallon of water and at a pH in the range of 3.0 to 5.0.

The compositions of this invention when put into aqueous solution may produce an acidic or alkaline solution depending on the weight ranges and components incorporated therein. However, to be effective an aqueous solution of the composition must have a pH in the range of 3.0 to 5.0. Thus it may be necessary to adjust the pH by use of an alkaline or acidic agent. Any such agents commonly used in the art can be used with the composition of this invention. Phosphoric acid is recommended to acidify a solution since it contributes phosphate ions which are necessary in the coating composition. Likewise, the alkali metal hydroxides are useful in raising the pH of a solution.

The function of the hydroxylamine or its salt is as an accelerator. As mentioned earlier, the preferred amount of accelerator is from about 1.0 to 10 weight percent based on the weight of the total composition. While the preferred accelerator is hydroxylamine or the aforementioned salts thereof, potassium bromate and hydroquinone and mixtures of the foregoing can also be satisfactorily employed. Irrespective of the particular accelerator utilized from this latter group, the accelerating effect on the coating action of the compositions of this invention should be equivalent to that obtained through the use of hydroxylamine or the salts thereof. It has been found that the quantity of each of the compounds in the above group that is needed in order to achieve about the same accelerating effect as 1.0 to 10 weight percent of the total composition of hydroxylamine and its salts is as follows: 1–10% of potassium bromate and 5–15% of hydroquinone.

On treating ferrous surfaces with the composition of my invention I observed that if a small amount of gluconic acid was added to the coating composition the resulting phosphate coating on the ferrous surface was formed more easily and was of somewhat better quality. The reason that gluconic acid contributes towards such improved quality seems to lie in the fact that the gluconic acid aids in dissolving and putting into solution the iron from the ferrous surface. While the addition of gluconic acid to the coating composition hereinabove described is in no way essential to the formation of good phosphate coatings, it is possible to achieve even better quality coatings by the use of a composition which comprises 2 to 98.5 weight percent of complex phosphates, about 0 to 96.5 weight percent of ortho-phosphates, about 1.0 to 10 weight percent of hydroxylamine and its salts and about 0.5 to 3.5 weight percent of gluconic acid (50%).

Thus far the discussion has been confined to coating compositions which can produce excellent phosphate coatings on ferrous surfaces at room temperature. Throughout that discussion it was assumed that the ferrous metal surface, upon which the phosphate coating was to be formed, was free from dirt and oil contamination. However, it should be recognized that the coating compositions of my invention are equally as effective when they are combined with metal cleaners so as to simultaneously clean the ferrous surface and deposit a phosphate coating thereon. In general any of the grease-removing solvents or detergents used in the art of phosphating for metal cleaning can be used with the composition of this invention.

In general, I have found that hydrocarbon solvents having a minimum boiling point of 150° F. are the most suitable grease-removing solvents. Examples of aromatic hydrocarbon solvents which were found effective are ortho-dichlorobenzene and toluol; aliphatic hydrocarbon solvents such as kerosene, hexane and mineral spirits are also effective. It should be remembered that the hydrocarbon solvent takes no part in the formation of the phosphate coating and serves only to clean the surfaces of the article to be coated. When incorporated with the above described phosphate coating compositions, it should be present in a concentration of from 0.5 to 4.0 weight percent of the total coating composition.

When a solvent, such as was described above, is added to the aforedescribed phosphate coating compositions of this invention it is also desirable to add, along with the solvent, certain surface active agents, one purpose of the agents being to maintain the grease removing solvent in the state of a stable emulsion. In fact, in many phosphate coating operations it is desirable to include surface active agents in the phosphate coating composition even though no grease removing solvent is incorporated therein. For example, the metal to be phosphate coated may be merely dirty or only slightly soiled, and, therefore, the action of the surface active agents alone would render the surface clean enough for coating. Even if the metal to be coated is clean, the presence of surface active agents in the coating solution enables coatings to be formed more rapidly due to the wetting of the metal surface by the surface active agents.

A major shortcoming of many phosphating-cleaner compositions is that they foam excessively when applied in spray washing equipment. This foaming problem is quite complex and is partially a function of the design of the spray equipment, but essentially it is a problem that is inherent in the use of organic detergents. Many attempts have been made to ameliorate this foaming problem and it has been recognized in the art that nonionic detergents as a class foam less than the anionic types and as a result this class of detergents has found wide use in phosphating-cleaner compositions.

In accordance with this premise I have found that ferrous surfaces can be simultaneously cleaned and phosphate coated while at room temperature most effectively by combining with the above described phosphate coatings of this invention certain surface active agents. Examples of such agents which have been found to be particularly effective are the ethylene oxide condensates, particularly those containing from about 3 to 25 polyoxyethylene groups therein, such as polyoxyethylene derivatives of oleic acid, which are commercially available under the names "Emulphor VN 430" and "Acco Emulsifier #5," and polyoxyethylene alkyl phenol derivatives, which are available commercially under the names "Antarox A," "Igepal" and Triton "X–100." In addition to these ethylene oxide condensates, I have also found that conjugated polyoxypropylene-polyoxyethylene compounds having the following formula are equally as suitable:

$$Y[(C_3H_6O)_y(C_2H_4O)_zH]_x$$

where:
Y is the residue of a low molecular weight (6 carbon atoms per molecule or less) organic compound containing therein $x$ hydrogen atoms capable of reacting with 1,2-propylene oxide,
$x$ is an integer greater than 1,
$y$ has a value such that the molecular weight of the compound, exclusive of the oxyethylene groups, is at least 900, and
$z$ has a value such that the oxyethylene groups constitute about 10 to 90% of the total weight of the compound.

The properties and the preparation of these conjugated polyoxypropylene-polyoxyethylene compounds are set forth in U.S. Patent No. 2,674,619, granted April 6, 1954, to Lester G. Lundsted, which description is incorporated herein by reference.

When surface active agents, selected from the above classes, are combined with the phosphate coating composition of this invention to form a phosphate-cleaner composition the resulting composition should contain from 1 to 10 percent by weight of the surface active agent, although smaller or larger quantities may be used where indicated by the condition and type of surface to be phosphated. It should be understood that the surface active agent can be any one of the ethylene oxide condensates or mixtures of such condensates.

As has been indicated, the essential features of this invention lie in the use, without external heating, of one of the aforementioned accelerators and a certain minimum of complex phosphates. However, it is seen that additional agents can be incorporated into the basic aforementioned composition so as to give a composition which simultaneously cleans and phosphate coats ferrous surfaces at temperatures in the range of about 70 to 100° F. Such a composition is one comprising 2 to 97 weight percent of complex phosphates, 0 to 95 weight percent of ortho-phosphates, about 1 to 10 weight percent of a nonionic surface active polyoxyethylene condensate, about 0.5 to 3.5 weight percent of gluconic acid (50%), about 0.5 to 4 weight percent of a hydrocarbon solvent for grease and oil and one of the aforementioned accelerators.

A feature of the compositions of this invention is that they are very stable. For example, 500-gram samples of each of the phosphate coating compositions of this invention were individually placed in a polyethylene bag which in turn was placed in a quart container. A 9-pound weight was then placed on top of the sample and sample was maintained at a temperature of 120° F. for 30 days. At the conclusion of these tests there was no evidence of odor, caking or deterioration. The samples were then put into aqueous solution and sprayed onto test panels with the resulting formation of excellent phosphate coatings.

The following examples are set forth to more clearly illustrate the principle and practice of this invention to those skilled in the art:

EXAMPLE I

This example illustrates the critical lower limit of complex phosphates that must be present in the phosphate coating compositions of this invention in order that they can produce coatings at temperatures in the range of about 70 to 100° F.

20 grams of monosodium phosphate, 1 gram of hydroxylamine sulfate and 1 gram of sodium acid pyrophosphate were dissolved in 1 liter of distilled water which was at a temperature of 82° F. The sodium acid pyrophosphate (complex phosphate) represented 4.5 weight percent of the phosphate coating composition. A 3″ by 5″ test panel of ferrous metal was then immersed in the coating solution which was allowed to stand without agitation. At the end of a 5-minute period a good phosphate coating was obtained upon the surface of the metal.

A new solution was then prepared in which 20 grams of monosodium phosphate and 1 gram of hydroxylamine sulfate were dissolved in 1 liter of distilled water which was at a temperature of 85° F. No complex phosphate was added. A ferrous metal test panel was then immersed therein. No phosphate coating was formed on the test panel. To this same solution was added ½ gram of sodium acid pyrophosphate representing 2.3 weight percent of the original coating composition added to the water. A phosphate coating was then obtained in about 6 minutes.

To illustrate that at least 2.0 weight percent of a complex phosphate must be in the coating composition a solution was prepared by adding 20 grams of monosodium phosphate, 1 gram of hydroxylamine and ¼ gram (1.2 weight percent) of sodium acid pyrophosphate to 1 liter of distilled water which was at a temperature of 85° F. A ferrous metal test panel was then immersed therein. At the end of 10 minutes an incomplete, blue-brown stain was deposited on the metal.

From the foregoing tests it is apparent that a complex phosphate must be present in the coating solution and must be present to the extent of at least 2.0 weight percent based on the weight of coating composition.

EXAMPLE II

A concentrated phosphate coating solution was prepared which consisted of:

| | Wt. percent |
|---|---|
| Monosodium phosphate | 73.0 |
| Sodium acid pyrophosphate | 15.0 |
| Hydroxylamine sulfate | 5.0 |
| Gluconic acid (50%) | 2.0 |
| Alkylarylpolyether alcohol (Triton X–100)[1] | 2.0 |
| EPE nonionic surfactant (Pluronic L62)[2] | 0.5 |
| Polypropylene glycol (Pluracol 2010)[3] | 0.5 |
| Petroleum naphtha | 2.0 |
| | 100.0 |

[1] Triton X–100 is an oxyethylated adduct of tertiary octyl phenol having an oxyethylene content such that a 1 weight percent aqueous solution has a cloud point of 149° F.
[2] Pluronic L62 is a polyoxyethylene-polyoxypropylene-polyoxyethylene polyol in which the molecular weight of the polyoxypropylene base is in the range of about 1500 to about 1800 and the ethylene oxide content of the molecule is about 20 weight percent.
[3] Pluracol P–2010 is a polypropylene glycol having a molecular weight of about 2,000 and being formed by adding propylene oxide to propylene glycol.

A working solution was made up by adding 3 ounces of the above phosphate coating concentrate to one gallon of water. The working solution was then sprayed at a temperature of approximately 75° F. onto an automotive grade steel test panel to produce an iron phosphate coating, after which the test panel was rinsed with water and treated for 30 seconds with a 10-ounce-per-gallon-of-water chromic acid solution, said solution being at a temperature of 160° F. The test panel was then painted with a production automotive paint so as to meet the specifications and requirements as found in the automotive industry. After the test panel was painted a scratch or scribed line was made through the paint and coating with a sharp instrument so as to expose the underlying metal.

Salt spray performance tests of the phosphate coating were then made in accordance with the American Society for Testing Materials (A.S.T.M.) method designated as B117–57T. This method may be found in ASTM 3, 306 and 8, 884. Basically, this salt spray method consists of spraying a salt solution having a pH in the range of 6.5 to 7.2 and at a temperature of 95° F. onto the surface of the test panel for a given period of time. In the actual tests performed, the salt solution was sprayed upon the surface of the test panel for periods of 48, 96, 173, 269 and 504 hours. After each of these periods the test panel was removed from the spray apparatus, dried and inspected for signs of corrosion. A jet of air at a pressure of about 45–50 p.s.i. was then focused at the scribed line for the purpose of dislodging any part of the coatings which had become loose. The salt solution is prepared by dissolving 5±1 parts by weight of salt in 95 parts of distilled water containing not more than 200 p.p.m. of total solids.

To determine the period of time that the phosphating solution had to be in contact with the ferrous metal to be coated in order to produce a good phosphate coating upon the metal, a series of runs was made in which the concentration, pH and temperature of the phosphating solution were held constant and the contact time varied from 0.5 to 3.0 minutes. The quality of the phosphate coating was indicated by the amount of corrosion and loose paint which had been formed during subsequent salt spray tests. The results of these tests are reported in terms of the width of the area of the coating which was corroded or loosened. The width was measured in terms of 1/16 of an inch; thus, in the following tables of data the symbol <1 means that the width of the corroded or loosened area was less than 1/16 of an inch while the figure 2 means that the width was 1/8 of an inch. Likewise, the symbol >1 means the width was more than 1/16 of an inch but less than 1/8 of an inch. The results of the above mentioned tests are shown in Table 1.

*Table 1*

| | | | |
|---|---|---|---|
| Concentration, oz./gal | 3 | 3 | 3 |
| pH | 3.4 | 3.0 | 3.6 |
| Temp., °F., Phosphating Soln | 80–82 | 82–85 | 78–85 |
| Contact Time (min.) | 1/2 | 1 | 3 |
| | Width of Coating Area Failure | | |
| Hrs. in Salt Spray: | | | |
| 48 | 0 | 0 | 1 |
| 96 | 0 | <1 | 1 |
| 173 | <1 | >1 | 2 |
| 269 | <1 | 3 | >2 |
| 504 | <1 | 3 | >2 |

It will be observed from the data that the phosphate coatings were highly resistant to corrosion and blistering and that the coating formed during the 0.5-minute contact time was equal or superior to that formed from the 1.0 and 3.0-minute contact periods.

EXAMPLE III

A series of runs was carried out to determine the ability of the phosphate coating composition of this invention to produce a phosphate coating at room temperature as opposed to the elevated temperatures required by other phosphating compositions found in the art. In these runs the phosphate coating solution and the salt spray test procedure were the same as described in Example II. The pH, concentration and time of contact of the phosphating solution were held constant and the temperature of the phosphating solution was varied. The test results are shown in Table 2. These results show that the coating obtained at a temperature of 82° F. was equal or superior in quality to those obtained at much higher temperatures.

*Table 2*

| | | | |
|---|---|---|---|
| Concentration, oz./gal | 3 | 3 | 3 |
| pH | 4.3 | 4.3 | 4.3 |
| Contact Time (min.) | 1.0 | 1.0 | 1.0 |
| Temp., °F., Phosphating Soln | 82 | 135 | 180 |
| Hrs. in Salt Spray: | Width of Coating Area Failure | | |
| 48 | <1 | >1 | <1 |
| 96 | <1 | >1 | >1 |
| 173 | 1 | >1 | 2 |
| 269 | >1 | >1 | >2 |
| 504 | >1 | 2 | >2 |

EXAMPLE IV

As a further check on the quality of coating produced by the phosphate coating composition of this invention, test panels of steel, such as that employed in automobile bodies, were treated with the phosphate coating solution as described in Example II. The panels were then rinsed in cold water and rinsed for 30 seconds in a 10-ounce-per-gallon solution of chromic acid at 160° F. After drying, the panels were painted with a production automotive paint and placed into a humidity cabinet which was operated at a temperature of 100° F. and 100% relative humidity. After the panels had remained in the humidity cabinet for a period of 336 hours they were removed and visually inspected for blistering or other indications of failure. The results of these tests are shown in the following table.

*Table 3*

| Phosphate Coating Solution | | | Contact Time (minutes) | Appearance |
|---|---|---|---|---|
| Concentration (oz./gal.) | pH | Temp., °F. | | |
| 3 | 3.4 | 80–82 | 1/2 | No general blistering. |
| 3 | 3.0 | 82–85 | 1 | Do. |
| 3 | 3.6 | 78–85 | 3 | Do. |
| 2 | 4.3 | 80 | 1/2 | Do. |
| 2 | 4.3 | 130 | 1/2 | Do. |
| 2 | 4.3 | 175 | 1/2 | Do. |

It should be pointed out that 336 hours in a humidity cabinet is very severe test and far surpasses the test specifications commonly used in industry. It is apparent from the data that high quality coatings are formed during short contact periods at both high and low temperatures.

EXAMPLE V

In order to demonstrate the use of accelerators other than hydroxylamine and its salts in the compositions of this invention a number of phosphate coating compositions were prepared which contained the same constituents with the exception that each composition employed a different accelerator. The common constituents of these compositions comprised 22 weight percent of the total composition and were as follows: 15.0 weight percent of sodium acid pyrophosphate, 2.0 weight percent of gluconic acid (50%), 2.0 weight percent of Triton X–100, 0.5 weight percent of Pluronic L62, 0.5 weight percent of Pluracol 2010 and 2.0 weight percent of petroleum naphtha. The remaining 78 weight percent of the compositions was made up as follows:

*Table 4*

| Composition | Accelerator | Wt. Percent Accelerator | Wt. Percent Monosodium Phosphate |
|---|---|---|---|
| A | Potassium bromate | 6.7 | 71.3 |
| B | Hydroquinone | 10 | 68 |

Working solutions of the above compositions were then made up by adding 3 ounces of the phosphate coating concentrate to one gallon of water. The working solution was then sprayed at a temperature of approximately 75° F. onto an automotive grade steel test panel and the panel subsequently painted as described in Example I. Salt spray tests were then made on the panels as described in Example I. The results of these tests are shown in the following table.

Table 5

| Composition | A | B |
|---|---|---|
| Concentration, oz./gal | 3 | 3 |
| pH | 4.0 | 3.7 |
| Temp., °F., Phosphating Solution | 75–85 | 75–85 |
| Contact Time (min.) | 1.0 | 1.0 |
| | Width of Coating Area Failure | |
| Hrs. in Salt Spray: | | |
| 90 | <1 | 0 |
| 138 | 1 | 1 |
| 168 | 1 | 1 |

From the data in Table 5 it is apparent that the phosphate coating compositions of this invention can incorporate any one of a group of accelerators and still produce phosphate coatings which are resistant to corrosion and blistering.

It should be apparent from the foregoing description that the objects of this invention have been obtained. The principal improvement lies in the fact that the phosphate coating composition of this invention makes possible the formation of a fine, uniform and tenacious phosphate coating on ferrous metal at room temperature.

I claim:

1. A method of applying a phosphate coating to the surface of ferrous metals which comprises contacting the ferrous metals at a temperature in the range from about 60 to 100° F. with an aqueous solution of a phosphate coating composition having a pH of about 3.0 to 5.0, said composition consisting essentially of 65 to 95 weight percent of orthophosphates, about 5 to 20 weight percent of complex phosphates, and an accelerator, said accelerator being selected from the group consisting of 1 to 10 weight percent of hydroxylamine, 1 to 10 weight percent of hydroxylamine salts, 1 to 10 weight percent of potassium bromate and 5 to 15 weight percent of hydroquinone.

2. The method of claim 1 wherein the accelerator is hydroxylamine sulfate.

3. The method of claim 1 wherein the accelerator is potassium bromate.

4. The method of claim 1 wherein the accelerator is hydroquinone.

5. A method of applying a phosphate coating to the surface of ferrous metals which comprises contacting the ferrous metals at a temperature in the range from about 60 to 100° F. with an aqueous solution of a phosphate coating composition having a pH of about 3.0 to 5.0, said composition consisting essentially of about 73 weight percent monosodium phosphate, about 15 weight percent of sodium acid pyrophosphate, about 5 weight percent hydroxylamine sulfate, about 2 weight percent gluconic acid (50%), about 2 weight percent of alkylarylpolyether alcohol, about 0.5 weight percent of a polyoxyethylene - polyoxypropylene-polyoxyethylene surfactant, about 0.5 weight percent polypropylene glycol and about 2 weight percent petroleum naphtha.

References Cited in the file of this patent

UNITED STATES PATENTS

| | | |
|---|---|---|
| 2,471,908 | Snyder | May 31, 1949 |
| 2,528,787 | Roland | Nov. 7, 1950 |
| 2,884,351 | Cavanagh et al. | Apr. 28, 1959 |
| 2,987,428 | Heller et al. | June 6, 1961 |

FOREIGN PATENTS

| | | |
|---|---|---|
| 726,935 | Great Britain | Mar. 23, 1955 |
| 731,882 | Great Britain | June 15, 1955 |